United States Patent [19]
Tanaka et al.

[11] Patent Number: 4,983,873
[45] Date of Patent: Jan. 8, 1991

[54] ELECTRICAL BRUSH ASSEMBLY

[75] Inventors: Noriyuki Tanaka; Hiroyuki Morikane, both of Himeji, Japan

[73] Assignee: Mitsubishi Denki Kabushiki Kaisha, Tokyo, Japan

[21] Appl. No.: 450,103

[22] Filed: Dec. 13, 1989

[30] Foreign Application Priority Data

Dec. 14, 1988 [JP] Japan .................................. 63-316915

[51] Int. Cl.$^5$ ............................................. H02K 13/00
[52] U.S. Cl. ..................................... 310/248; 310/233; 310/239; 310/242
[58] Field of Search ................. 310/148, 149, 151–153, 310/233, 239, 242, 245, 247, 51, 248, 249, 251, 253

[56] References Cited

U.S. PATENT DOCUMENTS

| 4,536,669 | 8/1985 | Morishita | 310/241 |
| 4,554,476 | 11/1985 | Gotoh | 310/249 |
| 4,673,836 | 6/1987 | Akiyama et al. | 310/239 |
| 4,673,838 | 4/1987 | Takagi et al. | 31/239 |
| 4,737,654 | 4/1988 | Morishita et al. | 290/48 |
| 4,785,214 | 11/1988 | Mummert | 310/239 |
| 4,868,441 | 9/1989 | Bulick | 310/249 |

FOREIGN PATENT DOCUMENTS

| 0081828 | 6/1983 | European Pat. Off. | 310/253 |
| 1199230 | 12/1959 | France | 310/251 |
| 1442484 | 5/1966 | France | 310/248 |
| 0249447 | 10/1988 | Japan | 310/248 |

*Primary Examiner*—R. Skudy
*Attorney, Agent, or Firm*—Sughrue, Mion, Zinn, Macpeak and Seas

[57] ABSTRACT

An electrical brush assembly for use with a d.c. dynamoelectric machine commutator 44 having a substantially cylindrical commutator contact surface 46 comprising an electrical brush element 48 having a sliding contact surface 50 engageable with the contact surface of the commutator. The brush element is slidably supported by a brush holder 54, and is urged against the contact surface of the commutator by a spring 58. The sliding contact surface of the brush element is a concave cylindrical surface having a central axis 62 substantially parallel to the central axis 45 of the commutator contact surface, and has a radius R2 about 1.2 to 2.5 times larger than the radius R1 of the commutator contact surface.

2 Claims, 3 Drawing Sheets

F I G. 4
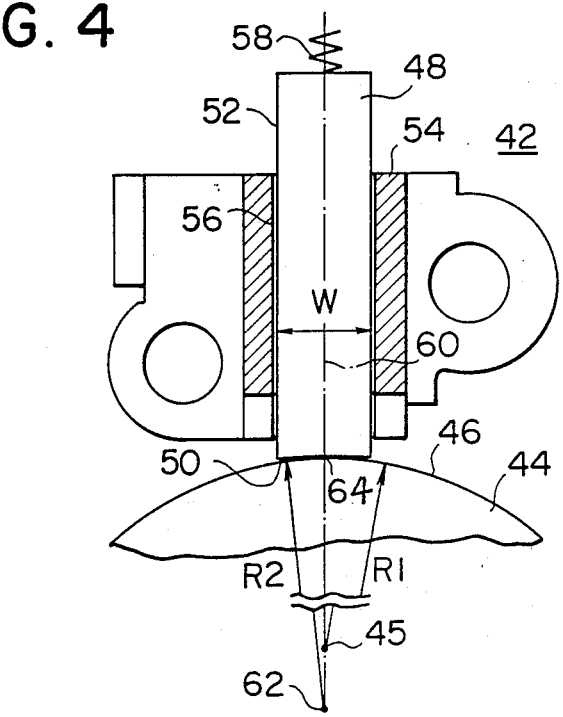

ELECTRICAL BRUSH ASSEMBLY

BACKGROUND OF THE INVENTION

This invention relates to an electrical brush assembly for use with a d.c. dynamoelectric machine commutator having a substantially cylindrical commutator contact surface.

FIG. 1 illustrates one example of a conventional electrical brush assembly 10 for use with a d.c. dynamoelectric machine including a commutator 12 having a substantially cylindrical commutator contact surface 14 in which a plurality of commutator segments (not shown) are formed. The outer diameter of the cylindrical commutator 12 may be from about 30 mm to about 40 mm. The brush assembly 10 comprises an electrical brush element 16 which is a rod-shaped electrically conductive member having a substantially flat end surface 18 constituting a sliding contact to be brought into contact with contact surface 14 of the commutator 12. The brush element 16 also has side support surfaces 20 which are to be slidably supported. The width dimension W of the brush element 16 as measured in the direction of rotation of the commutaor contact surface 14 may typically be from 4 mm to 7 mm.

The brush assembly 10 further comprises a brush holder 22 for slidably supporting the side support surfaces 20 of the brush element 16 for a sliding movement relative to the commutator 12 in a diametrical direction of the commutator and such that the contact surface 18 of the brush element 16 can be in a sliding contact relationship with the contact surface 14 of the commutator 12. In order to ensure a smooth sliding movement between the brush holder 22 and the brush element 16 supported therein, a small gap 23 of from 0.05 mm to 0.30 mm is defined between the inner surface of the brush holder 22 and the side support surface 20 of the brush element 16. This gap 23 is also necessary for easy assembly of the brush element 16 into the holder 22. The brush assembly 10 includes a compression spring 24 for urging the sliding contact surface 18 of the brush element 16 against the contact surface 14 of the commutator 12.

The brush element 16 has a central axis 26 which extends in a substantially radial direction with respect to the commutator 12 and which is perpendicular to the central axis 28 of the cylindrical commutator contact surface 14. Therefore, the sliding contacting surface 18 of the brush element 16 contacts with the contact surface 14 of the commutator 12 only at a line 30 between the brush element 16 and the commutator 12.

With the structure as above described, since the contact surface 18 of the brush element 16 is flat and the commutator contact surface 14 is cylindrical, the brush element 16 and the commutator 12 are in a line contact extending parallel to the central axis 28 as indicated by a line 30, making the brush unstable. Therefore, the brush element 16 chatters and bounces on the rotating coummutator 12, resulting in a poor electrical contact between the brush element 16 and the commutator 12 as well as the generation of a large noise. This lasts for a certain period of time at the initial stage of using a fresh brush element 16.

As the commutator 12 continues to rotate, the contact surface 18 of the brush element 16 wears as it is urged by the compression spring 24 and finally the entire contact surface 18 of the brush element 16 becomes a concave cylindrical surface having the same radius of curvature as that of the commutator contacting surface 14. At this stage, the brush element 16 is stable and no noise is generated and the desired good electrical contact is ensured between the brush element 16 and the commutator 12.

Therefore, an electrical brush assembly 32 as shown in FIG. 2 has been proposed in which a brush element 34 manufactured to have a sliding contact surface 36 that is a concave cylindrical surface is used from the very begining of operation of the machine. The concave cylindrical surface has a central axis 38 that coincides with the central axis 28 of the commutator contact surface 14 and therefore has a radius equal to the radius of the commutator contact surface 14, thereby establishing a surface contact between the commutator contact surface 14 and the entire area of the brush element contact surface 36.

With this arrangement, however, since there is provided a small gap 23 between the side support surface 20 of the brush element 34 and the inner surface of the brush holder 22, the brush element 16 is often diagonally assembled into the brush holder 22 as shown in FIG. 3. In this position, the sliding contact surface 36 of the brush element 34 is brought into contact only at one corner 40 of the element 34. This means that the position of contact of the brush element 34 to the commutator 12 is significantly shifted resulting in an effective change of the brush angle, causing the initial characteristics of the brush assembly to be very unstable.

SUMMARY OF THE INVENTION

Accordingly, one object of the present invention is to provide an electrical brush assembly free from the above-discussed problems of the conventional electrical brush assembly.

Another object of the present invention is to provide an electrical brush assembly in which the initial characteristics of the electrical brush assembly do not greatly change even when the brush element is tilted within the brush holder.

Another object of the present invention is to provide an electrical brush assembly in which the chattering of the brush element held by the brush holder on the rotating commutator is prevented.

Another object of the present invention is to provide an electrical brush assembly in which the electrical contact established between the brush element and the commutator is stable.

A further object of the present invention is to provide an electrical brush assembly in which the noise generated at the sliding brush element is lowered.

With the above objects in view, the electrical brush assembly of the present invention, which is for use with a d.c. dynamoelectric machine commutator having a substantially cylindrical commutator contact surface, comprises an electrical brush element having a sliding contact surface to be brought into contact with the contact surface of the commutator and a support surface. The brush element is supported at the support surface by a brush holder such that the brush element is slidable relative to the commutator of the d.c. dynamoelectric machine substantially in the radial direction, and that the contact surface can be in sliding contact with the contact surface of the commutator. A spring for urging the sliding contact surface of the brush element against the contact surface of the commutator is also provided. The sliding contact surface of the brush element is a concave cylindrical surface having a central axis substantially parallel to the central axis of the commutator contact surface and having a radius larger than the radius of the commutator contact surface by an amount effective establish a partial surface contact between the commutator contact surface and the brush element contact surface. The radius of the sliding contact surface of the brush element may be about 1.2 to 2.5 times than the radius of the commutator contact surface.

BRIEF DESCRIPTION OF THE DRAWINGS

The present invention will become more readily apparent from the following detailed description of the preferred embodiment of the present invention taken in conjunction with the accompanying drawings, in which:

FIG. 4 is a sectional view illustrating an electrical brush assembly of the present invention;

DESCRIPTION OF THE PREFERRED EMBODIMENT

Figure 1:
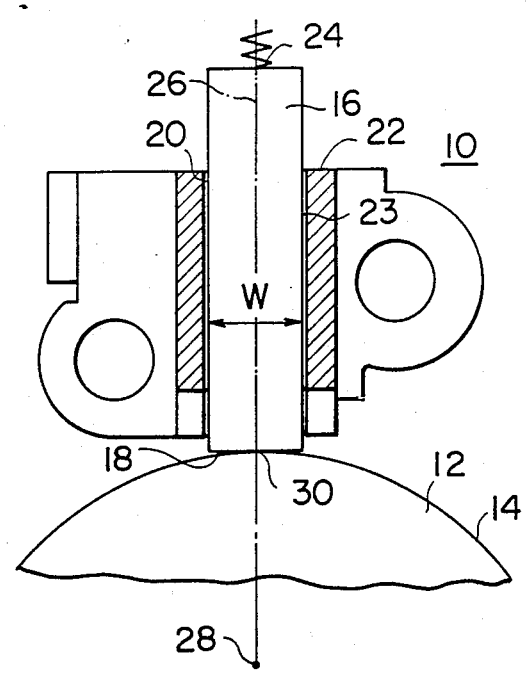
FIG. 1 is a sectional view illustrating a conventional electrical brush assembly with a brush element having a flat sliding contacting surface.

FIG. 4 illustrates one embodiment of an electrical brush assembly 42 according to the invention for use with a d.c. dynamoelectric machine including a commutator 44 having a substantially cylindrical commutator contact surface 46 in which a plurality of commutator segments (not shown) are formed. The radius R1 of the outer circumference of the cylindrical commutator 44 may be from about 15 mm to about 20 mm, and it has a central axis 45. The brush assembly 42 comprises an electrical brush element 48 which is a rod-shaped electrically conductive member having a substantially concave sliding, single, continuous contact surface 50 to be brought into contact with the contact surface 46 of the commutator 44. The brush element 48 also has side support surfaces 52 which are to be slidably supported. The width dimension W of the brush element 48 as measured in the direction of rotation of the commutator contact surface 46 may be from 4 mm to 7 mm.

The brush assembly 42 further comprises a brush holder 54 for slidably supporting the side support surfaces 52 of the brush element 48 for a sliding movement relative to the commutator 44 in a diametrical direction of the commutator and such that the contact surface 50 of the brush element 48 can be in a sliding contact relationship with the contact surface 46 of the commutator 44. In order to ensure a smooth sliding movement between the brush holder 54 and the brush element 48 supported therein, a small gap 56 of from 0.05 mm to 0.30 mm is defined between the inner surface of the brush holder 54 and the side support surface 52 of the brush element 48. This gap 56 is also necessary for easy assembly of the brush element 48 into the holder 54. The brush assembly 42 includes a compression spring 58 for urging the sliding contact surface 50 of the brush element 48 against the contact surface 50 of the commutator 44. The brush element 48 has a central, longitudinal axis 60 which extends in a substantially radial direction with respect to the commutator 44 and which is perpendicular to the central axis 45 of the cylindrical commutator contact surface 46.

According to the present invention, the sliding contact surface 50 of the brush element 48 is a concave cylindrical surface having a central axis 62 substantially parallel to the central axis 45 of the commutator contact surface 46 and having a radius R2 larger than the radius R1 of the commutator contact surface 46 by an amount effective establish a partial surface contact 64 between the commutator contact surface 46 and the brush element contact surface 50. In a preferred embodiment of the present invention, the radius R2 of the sliding contact surface 50 of the brush element 48 is about 1.2 to 2.5 times the radius R1 of the commutator contact surface 46. The radius R1 of the commutator contact surface 46 may be from 15 mm to 20 mm and the width W of the brush element 48 as measured in the direction of relative movement of the commutator contact surface 50 is from 4 mm to 7 mm.

Figure 2:
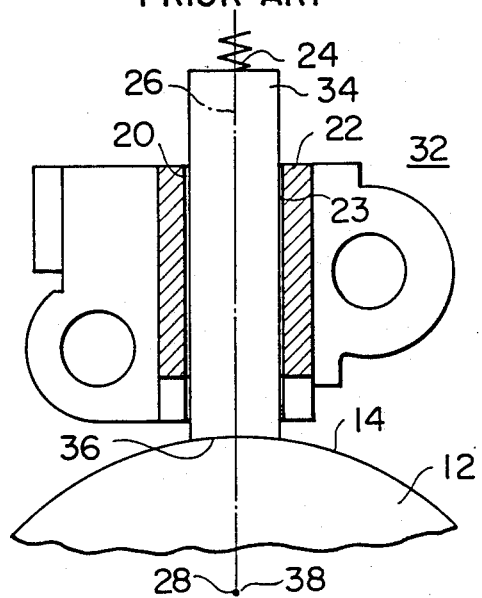
FIG. 2 is a sectional view illustrating another conventional electrical brush assembly with a brush element having a sliding contacting surface which is a concave cylindrical surface having a radius of curvature equal to that of the commutator outer circumference.
Figure 3:
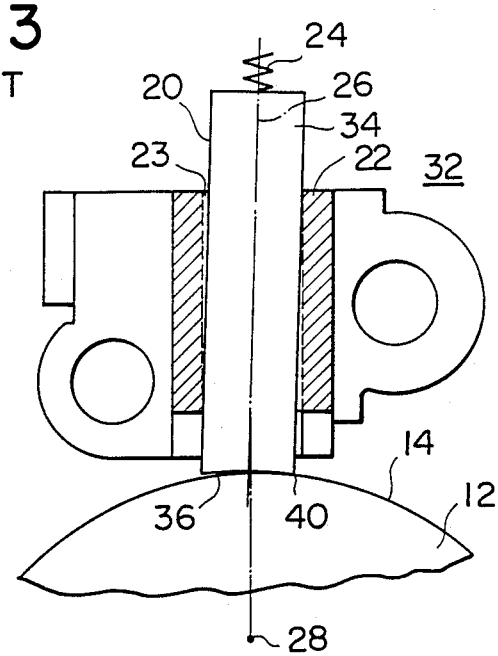
FIG. 3 is a sectional view of the electrical brush assembly shown in FIG. 2 with the brush element held tilted in the brush holder.
Figure 5:
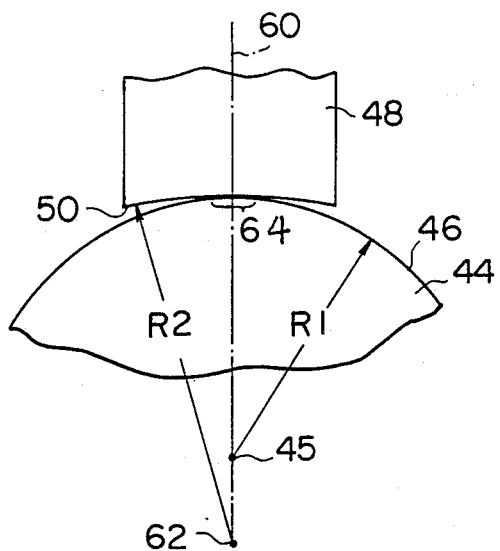
FIG. 5 is an enlarged schematic view illustrating the manner in which the brush element of the electrical brush assembly of the present invention is brought into contact with the commutator contact surface.

With the structure as above described, since the contact surface 50 of the brush element 48 is a concave cylindrical surface having a radius of curvature R2 larger than the radius of curvature R1 of the commutator contact surface 46, the brush element 48 and the commutator 44 are in a partial surface contact as indicated by reference numeral 64 as best seen from FIG. 5. This partial surface contact is maintained at a slightly shifted position on the sliding contacting surface 50 of the brush element 48 as exaggeratedly in FIG. 6 by the reference numeral 66 even when the brush element 48 is held tilted within the brush holder 54. It is to be noted that the area of the contact 64 between the brush element 48 and the commutator 44 depends on the difference between the radii R1 and R2 of curvature of the surfaces 46 and 50. Also, the amount of shift of the position of the contact 64 between the brush element 48 and the commutator 44 for a given amount of tilt of the brush element 48 is much smaller than that of the arrangement shown in FIGS. 2 and 3 in which the radius of curvature of the brush contact surface 36 is equal to the radius of curvature of the commutator contact surface 14.

Figure 6:
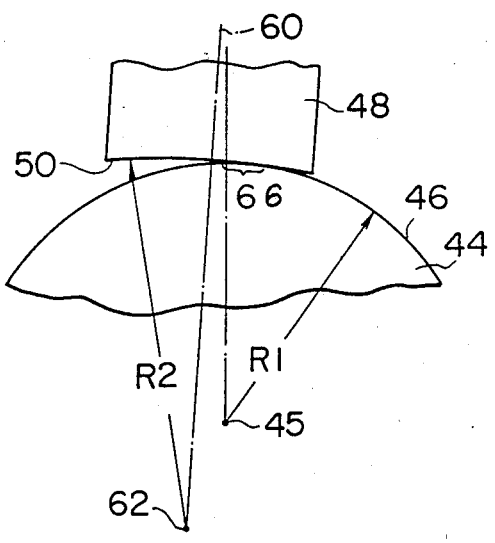
FIG. 6 is an enlarged schematic view illustrating the manner in which the brush element of the electrical brush assembly of the present invention in the tilted position is brought into contact with the commutator contact surface.

According to the electrical brush assembly 42 of the present invention, the brush element 48 and the commutator 44 are not in a line contact but in a surface contact from the initial stage of the operation of the d.c. dynamoelectric machine to which the brush assembly of the present invention is applied, so that no chattering and bouncing of the brush element 48 on the rotating commutator 44 occurs, maintaining a good electrical contact therebetween and preventing the generation of a large noise. Further, even when the brush element 48 is held in a tilted position in the brush holder 54 as shown in FIG. 6, the sliding contact surface 50 of the brush element 48 is brought into contact at the contact area 64 located on the contact surface 50 and not on the corner between the contact surface 50 and the side support surface 52, so that the amount of shift of the position of contact of the brush element 48 to the commutator 44 is significantly decreased as compared to that of the arrangement shown in FIGS. 2 and 3, causing the initial characteristics of the brush assembly to be stable.

As has been described, according to the electrical brush assembly of the present invention, the sliding contact surface of the brush element being a concave cylindrical surface having a central axis substantially parallel to the central axis of the commutator contact surface and having a radius larger than the radius of the commutator contact surface by an amount effective for establishing a partial surface contact between the commutator contact surface and the brush element contact surface. Accordingly, the initial characteristics of the electrical brush assembly does not greately change even when the brush element is tilted within the brush holder and the chattering of the brush element held by the brush holder on the rotating commutator is prevented, so that the electrical contact established between the brush element and the commutator is stable and the noise generated at the sliding brush element is lessened.

What is claimed is:

1. An electrical brush assembly for use with a d.c. dynamoelectric machine including a commutator (44) having a substantially cylindrical commutator contact surface (46), comprising:

an elongate electrical brush element (48) having a sliding contact surface (50) at one end engageable with said contact surface of said commutator, and a side support surface;

a brush holder (54) for slidably supporting said brush element such that said side support surface of said brush element is slidably supported for a sliding movement of said brush element relative to said commutator of the d.c. dynamoelectric machine substantially along a diameter of said commutator, and such that said contact surface of said brush element can be disposed in sliding contact with said contact surface of said commutator; and means (58) for urging said sliding contact surface of said brush element against said contact surface of said commutator;

wherein said sliding contact surface of said brush element is a single, continuous, concave cylindrical surface having a central axis (62) substantially parallel to a central axis (45) of said commutator contact surface, and has a radius (R2) of from 1.2 to 2.5 times larger than a radius (R1) of said commutator contact surface to establish a partial surface contact between said commutator contact surface and said brush element contact surface, and wherein a longitudinal axis (60) of said brush element substantially lies in a plane including said central axes of said commutator contact surface and said sliding contact surface of said brush element.

2. An electrical brush assembly as claimed in claim 1, wherein said radius of said commutator contact surface is from 30 mm to 40 mm and the width of said brush element as measured in the direction of relative movement of said commutator contact surface is from 4 mm to 7 mm.

* * * * *